United States Patent

[11] 3,575,497

| [72] | Inventor | Conrad L. Leblanc<br>Leominster, Mass. |
|---|---|---|
| [21] | Appl. No. | 848,938 |
| [22] | Filed | Aug. 11, 1969 |
| [45] | Patented | Apr. 20, 1971 |
| [73] | Assignee | Foster Grant Co., Inc.<br>Leominster, Mass. |

[54] AUXILIARY EYE PROTECTION ASSEMBLY
4 Claims, 6 Drawing Figs.

[52] U.S. Cl............................................................ 351/47, 351/48
[51] Int. Cl........................................................ G02c 7/10, G02c 9/04
[50] Field of Search.......................................... 351/47, 48, 57, 58, 59; 2/14, 13

[56] References Cited
UNITED STATES PATENTS

| 3,147,488 | 8/1964 | Maxson.......................... | 351/47X |
| 3,183,523 | 5/1965 | Harrison........................ | 2/13 |
| 3,383,707 | 5/1968 | McNeill.......................... | 351/59X |

FOREIGN PATENTS

| 578,464 | 7/1924 | France........................... | 351/57 |

*Primary Examiner*—David Schonberg
*Assistant Examiner*—John W. Leonard
*Attorneys*—Leroy G. Sinn, Leonard S. Selman and Coleman R. Reap

ABSTRACT: An auxiliary eye protection assembly adapted to clip onto a pair of spectacles and including a pair of lenses pivotally movable to a first position covering the spectacle lenses and a second uncovering position out of the line of vision of the wearer.

PATENTED APR 20 1971 3,575,497

INVENTOR.
CONRAD L. LeBLANC

BY Leonard S. Selman

ATTORNEY.

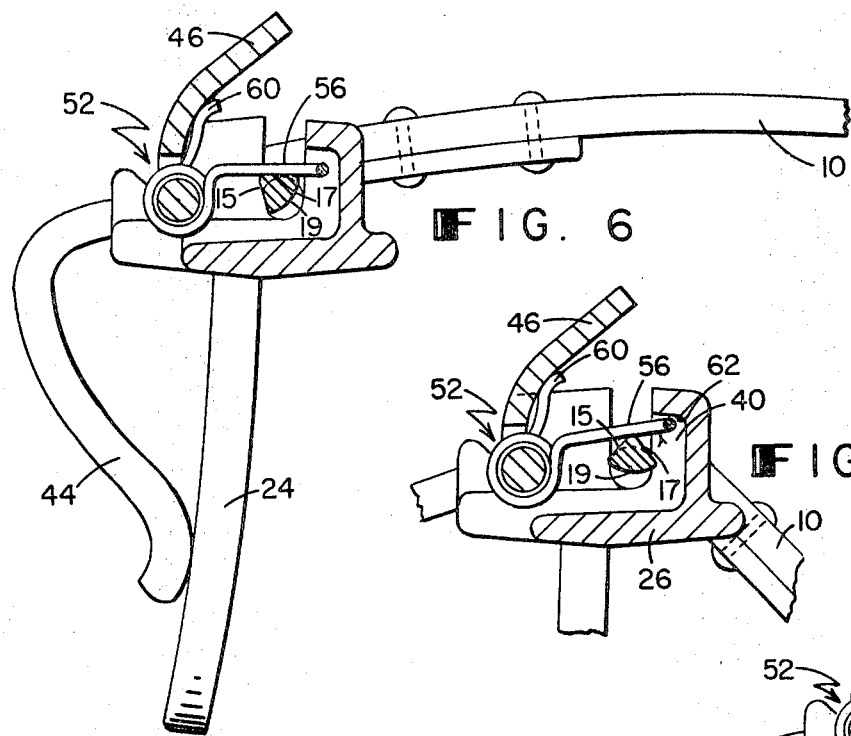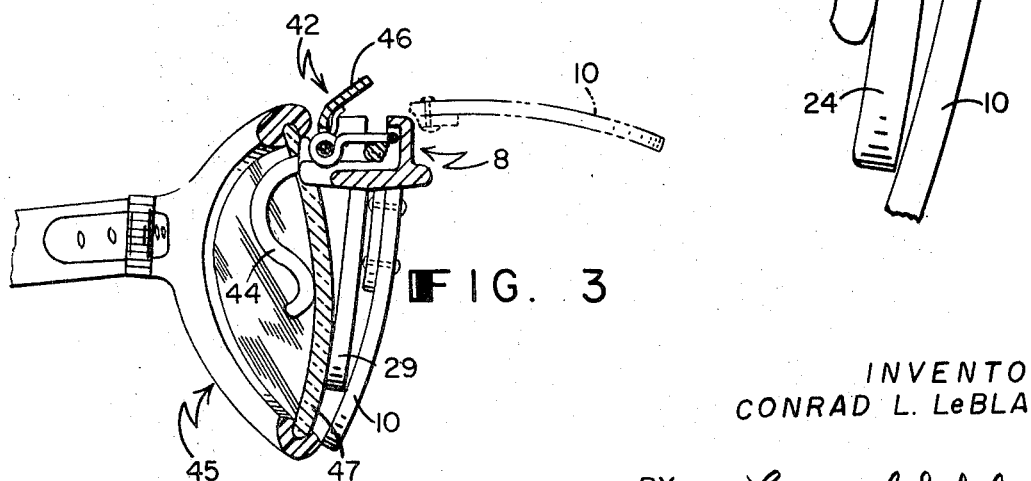

AUXILIARY EYE PROTECTION ASSEMBLY

This invention relates to an eye protection assembly and more particularly to auxiliary glasses designed to be removably attached to and supported by a pair of ordinary spectacles. The auxiliary glasses, which may be eye protectors or the like, commonly sunglasses, are pivotable between a first covering position wherein they overlie the spectacle lenses and a second uncovering position wherein they are removed from in front of the spectacle lenses and are no longer in the line of vision of the wearer.

For several years auxiliary glasses with this pivotable or "flip-up" feature have been produced; however, those available require the user to remove his ordinary spectacles in order to attach the auxiliary glasses thereto. This is usually accomplished by slipping the top portion of the spectacle frame between one or more pairs of fixed resilient clamping prongs or fingers which form part of an assembly that comprises the auxiliary glasses.

Having to remove one's spectacles to attach the auxiliary glasses can be a great inconvenience especially when driving an automobile, for example, which is one of the principal types of uses these auxiliary flip-up glasses are designed for.

Accordingly, it is an object of this invention to provide a pair of auxiliary glasses which may be adeptly attached to a pair of spectacles without removing the spectacles from the face of the wearer.

It is another object of the invention to provide a pair of flip-up, clipon auxiliary glasses for spectacles wherein the lens elements of the glasses are releasably but firmly held either in a first covering position relative to the spectacle lenses or a second noncovering position.

It is still another object of the present invention to provide a pair of auxiliary glasses which includes a clip element that is adjustable to fit a greater than usual variety of spectacle frames and has improved holding characteristics.

It is still a further object of this invention to provide a pair of flip-up, clipon auxiliary glasses for spectacles which are simple to manufacture and assemble and which are formed of a minimum number of parts.

Other objects and advantages of the invention will become apparent from the following description when taken in conjunction with the accompanying drawings in which FIG. 1 is a perspective view of the auxiliary sunglass assembly embodying the invention.

FIG. 3 is a sectional view of the assembly taken on line 3—3 of FIG. 1 and showing the auxiliary glasses in position of use on a pair of spectacles.

FIG. 4 is an enlarged fragmentary sectional view of the assembly as shown in FIG. 3 with the lens of the auxiliary glasses in the first or covering position.

FIG. 5 is a view as shown in FIG. 4 of the same elements shown in a central position during movement toward (or from) the second or uncovering position.

FIG. 6 is a sectional view as shown in FIG. 4 with the auxiliary glasses in the second or uncovering position.

Figure 1:
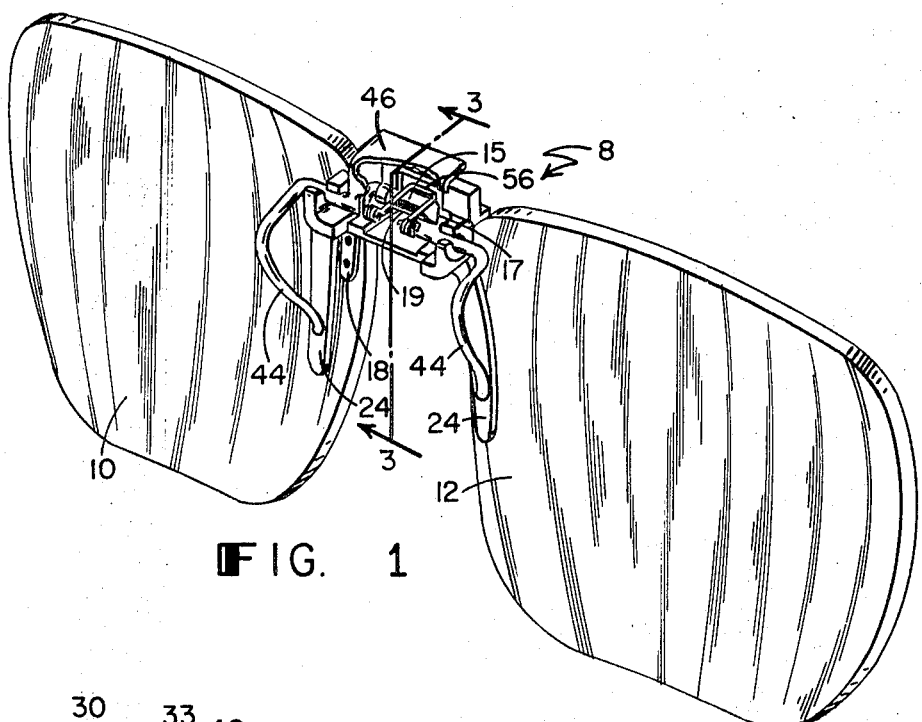
Figure 2:
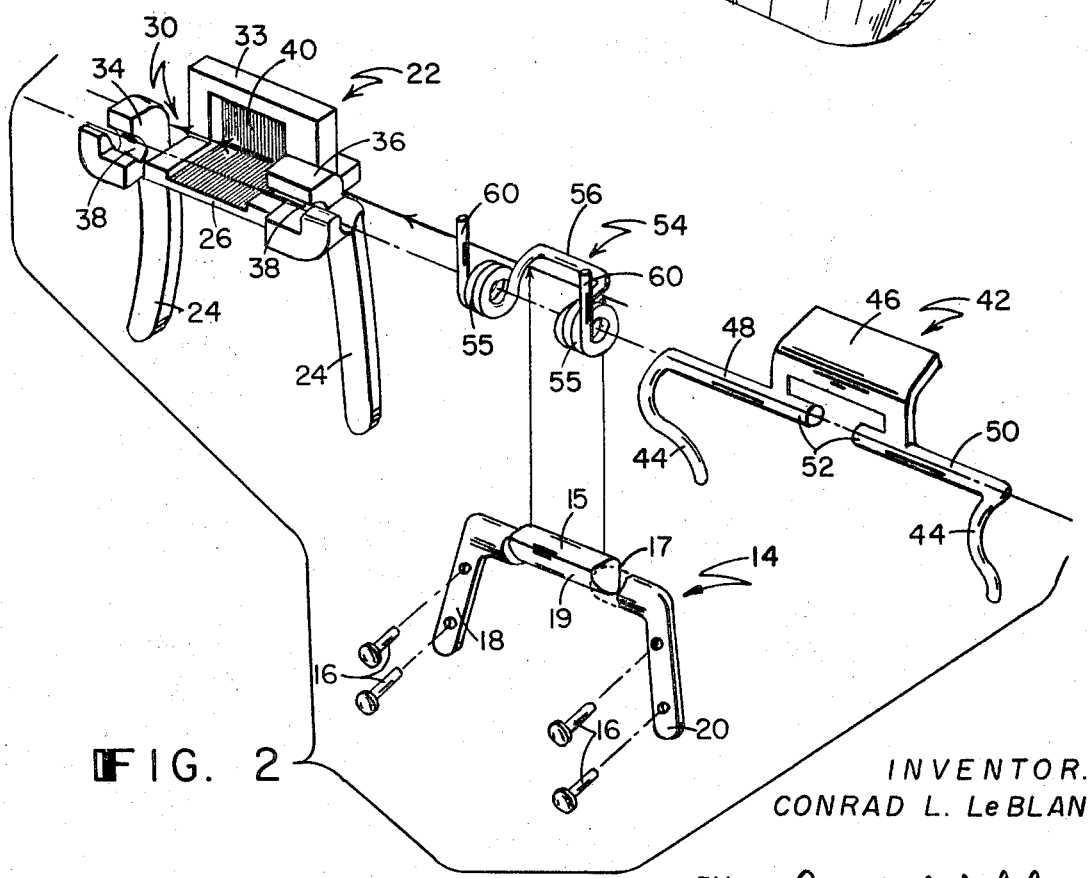
FIG. 2 is a perspective view of the principal elements of the assembly separated in space to illustrate them more clearly.

Referring more particularly to the drawings wherein like reference numerals designate like parts throughout the several views, FIG. 1 shows the several parts of the auxiliary sunglass assembly 8 in assembled relationship. FIG. 2 of the drawing is a perspective view of the various principal elements separated in space to illustrate them more clearly. The arrows and lead lines in FIG. 2 indicate how these principal elements are assembled. The pair of auxiliary sunglass lenses 10 and 12 are joined together by a generally U-shaped bridge 14. The bridge is preferably formed of metal and a plurality of rivets 16 are utilized to attach the lenses to each arm 18 and 20 thereof. In the center portion of the bridge a triangular portion is formed including a pair of substantially flat cam surfaces 15 and 17 and a rounded surface 19 joining them. The bridge 14 is pivotally supported on a support member 22 which is preferably a one-piece integrally molded member which serves a number of important functions. A pair of fingers 24 extend downwardly from the central body portion 26 thereof, which aid in attaching the sunglass assembly to a pair of spectacles. To rotatably support the bridge 14 a groove 30 is provided between the upstanding back portion 32 and a pair of bifurcated front portions 34 and 36. Each bifurcated portion has a receiving groove 38 molded therein. A recess 40 is also molded into the central body portion 38 of support member 22. With the use of injection molding techniques the member 22 may be economically manufactured from any of the well-known plastic materials.

In order to provide means for releasably attaching the auxiliary sunglasses to a pair of spectacles, a clip element 42 is provided which is received in the grooves 38 of the bifurcated portions 34 and 36 of support member 22. The clip element 42 is preferably formed of metal and includes a pair of downwardly extending prongs 44 and a centrally disposed, hand-engageable portion 46. Joining each prong with portion 46 is a pair of rod-like members 48 and 50, which include a pair of inwardly extending mounting portions 52. To serve as a biasing means for the clip element 42, a spring 54 is provided having several coils 55 surrounding each mounting portion 52 of the clip element. A U-shaped central portion 56 of the spring extends through an opening 58 of the clip element to coact, in a manner to be described, with the cam surfaces 15 and 17 of bridge 14. A pair of upstanding end portions 60 of spring 54 are in biasing contact with the inner surface of the hand-engageable portion 46 of the clip element 42 as shown in FIG. 3—6.

FIG. 3 illustrates how the auxiliary sunglass assembly is detachably mounted on a pair of spectacles 45 having lenses 47, one of which is shown. The hand-engageable portion 46 of clip element 42 is depressed against end portion 60 and the biasing force of spring 54, causing members 48 and 50 to rotate or pivot in their receiving grooves 38 and thus separating the prongs 44 form their normally biased position against the fingers 24 of support member 22. The sunglass assembly 8 is then slipped over the top frame of the spectacles in the bridge area thereof, and the portion 46 is released allowing the spring 54 to urge the prongs 44 toward the fingers 24, to remove the sunglass assembly from the spectacles. This operation is easily done with the use of one hand, leaving the other hand of the wearer free for driving an automobile, or the like, as previously pointed out.

The flip-up feature of the sunglass lenses is illustrated in FIGS. 4—6. FIG. 4 shows the lenses in a first position wherein it covers the lenses of the spectacles when the assembly is attached thereto, as shown in FIG. 3. In this first position cam surface 15 of bridge 14 is engaged by a U-shaped portion 56 of spring 52 to urge toward and maintain the sunglass lenses in their covering position. To flip the sunglass lenses out of the line of vision of the wearer to the second uncovering position, as shown in dark lines in FIG. 3, the user may grasp the edge of the lens and cause the bridge 14 to pivot in groove 30 on support member 22. FIG. 5 shows the position of the bridge 14 and cam surfaces 15 and 17 thereon in a central position just as the spring portion 50 is about to engage cam surface 17 after disengaging with cam surface 15. The spring portion 56 is stopped from further movement in this position by the inner wall portion 62 of groove 40. From this central position a small counterclockwise rotation of bridge portion 14 causes the spring portion to engage cam surface 24, and the biasing force of the spring against the cam surface urges the sunglass lenses toward their second uncovering position and maintains them in this position out of the line of vision of the wearer. Likewise, in the course of flipping the glasses down to their first covering position a slight clockwise rotation of the bridge portion from the central position shown in FIG. 5 causes the spring portion 56 to engage the cam surface 22, urging the lenses toward and maintaining them in the covering position.

Thus, the objects of the invention are achieved by an assembly including only four simple and inexpensive elements or members, as shown in FIG. 2, which are easily assembled and which cooperate in a novel manner to achieve the desired result.

I claim:

1. An auxiliary eye protection assembly comprising:

a pair of lenses;

a bridge joining together said lenses comprising a separate member extending between said lenses and attached to said lenses at each end thereof;

a clip element for removably attaching said auxiliary eye protection assembly to a pair of spectacles;

a support member having a body portion located substantially entirely between said pair of lenses, said support member being in contact with and pivotally supporting both said bridge and said clip element thereon, said support member including a pair of depending elongated fingers;

said clip element including a single hand-engageable portion centrally located above said body portion of said support member between said lenses and a pair of downwardly extending prongs;

a biasing means positioned on said assembly for normally biasing said prongs toward said fingers on said support member whereby a pair of spectacles may be engaged between said prongs and fingers, said hand-engageable portion being actuated by one hand to separate said prongs and fingers, allowing said auxiliary eye protection assembly to be attached to or removed from said pair of spectacles;

each of said auxiliary lenses covering a lens mounted in said spectacles in a first position, said bridge being manually pivoted on said support member to move said auxiliary lenses to a second uncovering position wherein they are removed from in front of the spectacles and are no longer in the line of view of the wearer.

2. An auxiliary eye protection assembly comprising:

a pair of lenses;

a bridge connecting said lenses;

a clip element for removably attaching said auxiliary eye protection assembly to a pair of spectacles;

a support member for pivotally supporting both said bridge and said clip element thereon, said support member including a pair of depending elongated fingers;

said clip element including a hand-engageable portion and a pair of downwardly extending prongs;

a single biasing means positioned on said assembly for normally biasing said prongs toward said fingers on said support member whereby a pair of spectacles may be engaged between said prongs and fingers, said hand-engageable portion being actuated to separate said prongs and fingers, allowing said auxiliary eye protection assembly to be attached to or removed from said pair of spectacles;

each of said auxiliary lenses covering a lens mounted in said spectacles in a first position, said bridge being manually pivoted on said support member to move said auxiliary lenses to a second uncovering position wherein they are removed from in front of the spectacles and are no longer in the line of view of the wearer;

said single biasing means also serving as a means for biasing said auxiliary lenses in either said first or second positions and including a portion which coacts with said bridge connecting said auxiliary lenses to urge and maintain said auxiliary lenses in their selected position.

3. The assembly of claim 2 wherein said bridge has first and second cam surfaces thereon; and said single biasing means include a portion which coacts with said first cam surface to urge toward and maintain said auxiliary lenses in said first covering portion and coacts with said second cam surface to urge toward and maintain said auxiliary lenses in said second uncovering position.

4. The assembly of claim 2 wherein said single biasing means comprises a spring having several coils mounted on said clip element and a U-shaped portion which coacts with said first cam surface in said first covering position of said auxiliary lenses and with said second cam surface in said second uncovering position of said auxiliary lenses.